US012654321B2

(12) United States Patent
Erlewein et al.

(10) Patent No.: US 12,654,321 B2
(45) Date of Patent: Jun. 16, 2026

(54) METHOD OF IMPROVING A PREPLANNED MOVEMENT SEQUENCE FOR THE CONTROL OF A ROBOT

(71) Applicant: SICK AG, Waldkirch (DE)

(72) Inventors: Patrick Erlewein, Heuweiler (DE); Christoph Hansen, Hamburg (DE); Max Franz, Oberried (DE)

(73) Assignee: SICK AG, Waldkirch (DE)

( * ) Notice: Subject to any disclaimer, the term of this patent is extended or adjusted under 35 U.S.C. 154(b) by 255 days.

(21) Appl. No.: 18/141,985

(22) Filed: May 1, 2023

(65) Prior Publication Data

US 2023/0347518 A1 Nov. 2, 2023

(30) Foreign Application Priority Data

May 2, 2022 (DE) .......................... 102022110645.4

(51) Int. Cl.
*B25J 9/16* (2006.01)

(52) U.S. Cl.
CPC ........... *B25J 9/1666* (2013.01); *B25J 9/1676* (2013.01)

(58) Field of Classification Search
CPC ...... B25J 9/1676; B25J 9/1666; B25J 9/1664; B25J 19/06; B25J 9/163; B25J 13/086;
(Continued)

(56) References Cited

U.S. PATENT DOCUMENTS

2022/0105634 A1 4/2022 Oboril et al.
2023/0123463 A1* 4/2023 Lin .......................... B25J 13/08
700/248

FOREIGN PATENT DOCUMENTS

DE 102013110901 A1 * 4/2015 ........... B25J 9/1666
DE 102013110905 A1 4/2015
(Continued)

OTHER PUBLICATIONS

Search Report dated Sep. 26, 2023 issued in corresponding European Application No. 23165789.1.
(Continued)

*Primary Examiner* — Khoi H Tran
*Assistant Examiner* — Alyse Tramanh Tran
(74) *Attorney, Agent, or Firm* — Nath, Goldberg & Meyer; Jerald L. Meyer

(57) ABSTRACT

For the control of a robot operated as part of a human-robot collaboration, a preplanned movement sequence is provided that comprises a defined movement path along which the robot is to move in order to perform a specific task, and a defined speed development according to which each point of the movement path is associated with a speed at which the robot is to move at the respective point. A method of improving the preplanned movement sequence comprises the following steps: The robot is controlled to repeatedly run through the preplanned movement sequence; during the repeated run-through of the preplanned movement sequence, an environment of the robot is monitored and, in so doing, disturbances are detected that emanate from objects that are located in this environment or that enter into this environment so that an endangerment by the respective object by the robot results therefrom; on the repeated run-through, for a plurality of different sections of the movement path, the frequency of disturbances detected in the respective section is determined; after the repeated run-through of the preplanned movement sequence, a modified speed development is determined in that, for the different sections, the speeds associated with the points of the respective section are modified in dependence on the frequency determined for the respective section; finally, an improved movement sequence that comprises the modified speed development is provided for the further control of the robot.

19 Claims, 2 Drawing Sheets

(58) Field of Classification Search
CPC ...... B25J 9/1669; B25J 9/1697; B25J 19/023;
G05B 2219/40202; G05B 19/4155; G05B
2219/36043; G05B 2219/39219; G05B
2219/39433; G05B 2219/40371; G05B
2219/40382; G05B 2219/40512; G05B
2219/40519; G05B 2219/40521; G05B
19/416; G05B 2219/40317; G05B
2219/40475; G05B 2219/40476; G05B
2219/40492; G05B 2219/49138; G05B
2219/49141
See application file for complete search history.

(56) References Cited

FOREIGN PATENT DOCUMENTS

| | | | | |
|----|----|----|----|----|
| DE | 102014007624 | A1 | 11/2015 | |
| DE | 102015114463 | A1 | 3/2017 | |
| DE | 102016222245 | A1 | 5/2018 | |
| DE | 102017202004 | A1 | 8/2018 | |
| DE | 102018214439 | A1 | 5/2019 | |
| DE | 102019102833 | A1 * | 8/2020 | ........... B25J 13/086 |
| DE | 102020203636 | A1 | 9/2021 | |

OTHER PUBLICATIONS

Office Action dated Nov. 28, 2022 issued in German Application
No. 102022110645.4.

* cited by examiner

METHOD OF IMPROVING A PREPLANNED MOVEMENT SEQUENCE FOR THE CONTROL OF A ROBOT

FIELD

The invention relates to a method of improving a preplanned movement sequence for the control of a robot that is operated as part of a human-robot collaboration.

BACKGROUND

In particular in the industrial environment, robots can be used to perform specific tasks. This in particular relates to tasks in which particularly large forces have to be exerted and/or which have to be performed at a high speed and with a high precision, in particular if the respective task has to be performed very often in the same way. However, there are also tasks that can be performed better by a human than by a robot. This in particular relates to tasks that are difficult to automate, for instance since they require experience and/or a high degree of adaptability. In processes that involve both work of the one kind and work of another kind, it can therefore be expedient if humans and robots work together to combine their respective strengths as efficiently as possible.

The nature of the cooperation can be different in this respect. For example, the working zones of a robot and a human can merely overlap, wherein no direct interaction between the robot and the human takes place, or wherein an interaction is only provided when the robot is stationary. Such a form of cooperation is also designated as human-robot cooperation. However, the cooperation can also go so far that a direct interaction up to a scheduled contact between a human and a robot takes place, for instance when the human and the robot are working at a workpiece at the same time or the robot is hand-guided. This kind of cooperation is also designated as human-robot collaboration. With respect to the present invention, human-robot collaboration is to be understood in a rather broad sense and can comprise all of the mentioned forms of the cooperation, i.e. also human-robot cooperations.

For certain tasks, it can be expedient for the control of a robot operated as part of a human-robot collaboration to preplan a movement sequence. Such a movement sequence can in this respect, on the one hand, comprise a defined movement path along which the robot is to move in order to perform the respective task; the robot can in this respect generally be stationary and the movement path can be run through by a specific part of the robot, e.g. the end of a robot arm provided with a tool, or the robot can move as a whole along the movement path, e.g. travel along it. On the other hand, the movement sequence can comprise a defined speed development according to which each point of the movement path is associated with a speed at which the robot is to move at the respective point. It is therefore completely predefined by the movement sequence at which point in space the robot is to be located at which point in time since the start of the run-through of the movement sequence. The preplanning of the movement sequence comprises defining the movement path and the speed development. It is expediently already taken into account in the planning on which movement path the robot is likely to be able to move as unhindered as possible and without endangering others and in which sections of the movement path a high speed is likely to be possible and in which sections a rather low speed is to be preferred in order to avoid possible collisions.

The movement sequence is in this respect ideally preplanned such that, on the one hand, it meets high requirements for safety so that collisions of the robot in particular with humans are prevented and such that, on the other hand, the task to be performed is completed as quickly as possible to achieve a high productivity and economic efficiency of the application.

However, the preplanning of the movement sequence is necessarily based on assumptions about the sequence of the performance of the respective task that are not necessarily true. This is not only because practice often looks different from theory, but can also result from the fact that not every task is monotonically always to be performed in the same way. For precisely due to the interaction between humans and robots, the cycles of a task to be performed repeatedly can differ from one another so that the extent to which the assumptions underlying the preplanned movement sequence are correct only becomes apparent through a multiple processing of the task.

Furthermore, in a human-robot collaboration, provision is usually made that the robot is not controlled to also actually run through the preplanned movement sequence under all circumstances along the defined movement path and with the defined speed development. For due to the high requirements with respect to the safety of the people involved, it is important that it is continuously monitored whether the risk of a collision or any other hazard is present and, if necessary, that it is possible to spontaneously deviate from the preplanned movement sequence in order to avoid the hazard. In this regard, the planned movement sequence merely represents a desired sequence.

To adapt the movement sequence ad hoc to the respective actually present conditions, various concepts are known that usually comprise that an environment of the robot is monitored for the presence of humans or other objects by means of sensor devices to be able to react directly to disturbances. If, in this way, an object is detected and it is determined that there is a risk of a collision with the robot for this object, provision can be made that, in response to this, the movement path of the robot is changed so that it performs an evasive maneuver around the object. Alternatively or also additionally thereto, provision can be made for this purpose that the robot spontaneously reduces its speed, in particular even stops. To be able to estimate the risk of a collision particularly reliably and to avoid false alarms, provision can furthermore be made that not only the positions of the objects are detected, but their respective movement is also monitored in the sense of a tracking to also be able to predict (at least to a certain extent) the further course of their movement and to include it in the decision on the triggering of a deviation from the preplanned movement sequence.

Such concepts each require a high processing power since they involve complex calculations, which is in particular due to the fact that potential hazards have to be reacted to ad hoc and a large amount of data therefore has to be continuously collected and processed. Furthermore, such concepts often lead to very sudden reactions to detected disturbances. Abrupt changes in the movement of the robot, however, lead to a high wear. A further disadvantage of such concepts is that the productivity is reduced by a stopping of the robot or by an evasive maneuver. Furthermore, such reactions of the robot can also create a feeling of insecurity for a human working together with the robot since the robot does not behave as expected due to the deviation from the preplanned movement sequence. It can in particular be difficult for the human to predict under what circumstances the robot will deflect and where. This can lead to a reduced acceptance of the respective concept. A movement path that is as fixed as possible can, in contrast, ensure that humans feel comfortable when working together with the robot.

Planning methods for planning and implementing human-robot collaboration sequences are known from DE 10 2013 110 901 A1 and DE 10 2013 110 905 A1 in which a working environment of the robot, which is designated as a "layout", and a movement plan for an activity to be performed by the robot are recorded within the layout. Furthermore, an evaluation module is provided that creates an injury profile in the event of a possible collision of a human with the robot based on human anatomy data, speed profiles, and geometries. Based on these data, the layout is divided into different zones having movement sections that differ in accordance with the collaboration activity, wherein different risk classes are assigned to the zones. Here, the risk classes reflect the collision probability and the risk of injury. Provision can be made in this respect that the speed of the robot is increased or decreased in dependence on the risk classes. However, this adaptation of the speed does not take place based on empirical data that are acquired during the ongoing operation of the robot, but the improvement of the movement plan is rather based on a model that comprises the mentioned human anatomy data, speed profiles, and geometries. An increased effort in the path planning and robot programming thereby arises and the implementation requires a high processing power, in particular using additional hardware. Furthermore, it cannot be ruled out that the underlying model includes assumptions that only turn out to be incorrect in ongoing operation.

A "human-robot collaboration system" in which the movement of the robot is planned by means of movement planning algorithms is further known from US 2021/0309264 A1. Here, an intention of the human working with the robot is predicted with the aid of perceptual systems, generative models based on task knowledge, and probabilistic approximate inference. The robot is thereby able to move in accordance with the predictions about the behavior of the interacting human. However, such a method for collision avoidance is very computationally intensive. Furthermore, a comprehensive adaptation of the movement sequence to the predicted behavior of a human is indeed very flexible. Conversely, however, it is then difficult or impossible for the human to reliably predict the movement of the robot, which can lead to uncertainty on the part of a human working together with the robot and impairs the acceptance of such a system.

SUMMARY

It is an object of the invention to provide a method by which a preplanned movement sequence for the control of a robot operated as part of a human-robot collaboration can be improved to such an extent with a comparatively low computational effort to be as optimal as possible with regard to a high productivity, a high safety, and a low wear of the robot and in this respect to offer a high degree of user-friendliness and thus also high level of acceptance.

The invention is in this respect based on the assumption that, by observing a plurality of actual run-throughs of a movement sequence preplanned for the execution of a task, it can be easily determined, based on data of a sensor system that is usually provided at the robot anyway or can be additionally provided, where many disturbances occur within a run-through and reactions must take place and where not, and that, based on this information, the movement sequence can be improved such that where many disturbances occur, violent reactions can be avoided as far as possible, in particular e.g. by decreasing the predefined speed, whereas where no disturbances occur, the productivity can be increased as far as possible, in particular e.g. by increasing the predefined speed.

The method in accordance with the invention serves to improve a preplanned movement sequence for the control of a robot operated as part of a human-robot collaboration. For example, a memory can be provided in which the preplanned movement sequence is stored and from which said preplanned movement sequence can be read out by a control apparatus for controlling the robot. The preplanned movement sequence can in this respect have been planned in advance in a fundamentally arbitrary manner, for example, in accordance with a method of path planning that is generally known per se. The preplanned movement sequence comprises a defined movement path along which the robot is to move in order to perform a specific task, and a defined speed development in accordance with which each point of the movement path is associated with a speed at which the robot is to move at the respective point. The preplanned movement sequence is preferably completely defined by the movement path and the speed development.

The movement path can be formed by a continuous sequence of points. Each of these points can be defined by a plurality of coordinates. They can be common three-dimensional spatial coordinates that can e.g. be defined in a Cartesian coordinate system. In this regard, the movement path can correspond to a distance in space that is to be traversed by a specific reference point defined at the robot. The reference point can, for example, be the so-called Tool Center Point (TCP) of the robot, a central point of a tool (e.g. the tool tip) provided at the robot. When the movement sequence is run through as preplanned, the reference point of the robot therefore moves along the movement path and in this respect has its spatial coordinates at a respective point of the movement path.

However, the points of the movement path do not necessarily have to be defined by three-dimensional spatial coordinates. For example, alternatively thereto, it is conceivable that the points of the movement path are defined by coordinates, each of which corresponds to a degree of freedom of the robot (e.g. an angle adopted by a joint of the robot). The coordinates of a respective point of the movement path therefore then indicate which state or which position the robot is to adopt at this point of the movement path.

That a speed is associated with each point of the movement path does not necessarily imply a continuous association in the sense of a mathematical function. Rather, the movement path and likewise the speed development can be defined with a specific temporal and/or spatial resolution so that they are concretely defined only for a specific finite set of points. The resolution is in this respect advantageously selected such that the regions between these points do not play a role for the control of the robot to run through the movement sequence. Otherwise, if necessary, provision can be made that the coordinates of further points of the movement path and the speeds associated with these further points in accordance with the speed development are each determined by interpolation.

The method comprises the robot being controlled, for example by said control apparatus, to repeatedly run through the preplanned movement sequence; and during the repeated run-through of the preplanned movement sequence, an environment of the robot being monitored, for example by a monitoring apparatus that can be integrated into the control apparatus, for instance by means of one or more sensor devices, and, in so doing, disturbances being detected that emanate from objects that are located in the environment or that enter into the environment so that an endangerment of the respective object by the robot results therefrom (i.e. from the presence in the environment or the entry into the environment), in particular a risk of a collision of the respective object with the robot. In this connection, a human can also be regarded as an object, e.g. a human working together with the robot as part of the human-robot collaboration.

In other words, the robot is operated in a regular manner, i.e. it is used as part of a human-robot collaboration to perform the task to be performed in a scheduled manner in cooperation with one or more humans. For this purpose, the robot is controlled to move along the movement path of the preplanned movement sequence in accordance with the speed development of the preplanned movement sequence, at least as long as there is no reason to deviate from the movement sequence. Such a reason can arise from the presence of a disturbance that is detected due to the monitoring of the environment of the robot, wherein the environment can, for example, comprise the entire space that is accessible to the robot. The monitoring of the environment of the robot and the detection of disturbances within this environment can in this respect take place in a generally known manner. A suitable sensor system can in particular be provided that can be located at the robot or in the environment of the robot. For example, the robot can have a capacitive robot skin and/or one or more time-of-flight sensors to detect distances of objects from the robot. Alternatively or additionally thereto, a camera system with spatial resolution can be provided by which the environment of the robot can be visually captured.

The detection of disturbances can in this respect be limited to determining whether or not an object, for instance a human working together with the robot, is in the environment of the robot. However, the type of object from which the disturbance emanates (shape, dimensions, material, position, movement) and/or the type of hazard from which the disturbance results (probability of a collision, degree of possible injury) can also be determined, in particular depending on the level of detail required for a respective protection concept. Furthermore, provision can be made that in accordance with a specific protection concept generally known per se, a detected disturbance and the hazard resulting therefrom is reacted to (for instance through evasion or stopping) in order to protect the respective object, in particular if it is a human.

In accordance with the invention, the method further comprises, on the repeated run-through of the preplanned movement sequence, for a plurality of different sections of the movement path, the frequency of disturbances detected in the respective section being determined; after the repeated run-through of the preplanned movement sequence, a modified speed development being determined in that, for the different sections, the speeds associated with the points of the respective section are modified in dependence on the frequency determined for the respective section; and an improved movement sequence that comprises the modified speed development being provided for the further control of the robot. The improved movement sequence can then be written to the memory in which the preplanned movement sequence was previously also stored (that is possibly overwritten in the process) and from which the improved movement sequence can then be retrieved for controlling the robot. The steps mentioned can, for example, be performed by the monitoring apparatus or by the control apparatus. In general, an optimization apparatus can also be provided that receives at least the speed development of the preplanned movement sequence from the memory and receives information about detected disturbances from the monitoring apparatus and determines the modified speed development with which the improved movement sequence can ultimately be provided, for example, by writing it to the memory and/or by outputting it to the control apparatus.

In accordance with the described method, the robot is therefore put into operation and used multiple times in accordance with the preplanned movement sequence to perform the respective task as part of a human-robot collaboration in order to gain knowledge therefrom that can then be used for the improvement of the movement sequence. Specifically, the frequency of disturbances is in this respect used as a basis for the improvement of the movement sequence. It is important that this frequency is determined with respect to the location of the disturbance along the movement path, i.e. that it is recorded where particularly many or particularly few disturbances occur along the movement path of the preplanned movement sequence. For this purpose, it is determined separately for a plurality of different sections of the movement path how often a disturbance has been detected during the repeated run-through of the preplanned movement sequence while the robot was located at a point of the movement path that lies in the respective section. In this way, a histogram of the disturbances along the movement path can be determined.

Based on the determined frequencies, the speed development is then modified. The modified speed development determined in this way in this respect also associates each point of the movement path with a speed at which the robot is to move at the respective point. However, the modified speed development differs from the speed development of the preplanned movement path in that the points of the movement path are associated with a modified speed that can differ from the originally associated speed. In this respect, it is essential to the invention that the modification of the speeds associated with the respective points takes place in dependence on the frequency with which disturbances have been detected in the section of the movement path in which the respective point lies. In this regard, the improvement of the movement sequence is empirically based and is thereby particularly practice-oriented.

The modified speed development determined is finally included in an improved movement sequence which the method in accordance with the invention then provides as a result. Subsequently, the robot can be controlled in accordance with this improved movement sequence instead of the preplanned movement sequence.

Due to the described procedure, disturbances are localized and registered during operation of the robot. Additional information on the sections of the movement path in which a disturbance frequently or rarely occurs thereby results. This additional information can then be used to increase the productivity of the robot, in particular by increasing the speed of the robot in sections with few disturbances and/or decreasing it in sections with many disturbances, based on the detected frequencies of disturbances. Due to a decreased speed in sections with many disturbances, disturbances advantageously lead less often to violent reactions (pronounced braking, sudden swerving) of the robot so that the robot joints are spared and psychological stress is avoided for the humans working together with the robot.

The method in accordance with the invention naturally does not rule out that results from possibly performed trial run-throughs, test run-throughs, or calibration run-throughs outside regular operation can also be included in the optimization of the movement sequence.

It is particularly advantageous if the improved movement sequence comprises the same movement path as the preplanned movement sequence. In such an embodiment, only the speed development is therefore changed, while the movement path of the improved movement sequence remains unchanged and is thus identical to the movement path of the preplanned movement sequence. This has the advantage that a human working together with the robot does not have to adjust to a new movement path after an improvement in the movement sequence. Furthermore, since violent ad-hoc reactions of the robot to detected disturbances are avoided by the method in accordance with the invention, the method overall has the result that the robot more reliably conforms to the expectation of a movement along the defined movement path. Such an embodiment enhances the user-friendliness to a particular degree since it provides a reliable movement path and provides slow speeds where the risk of an endangerment is actually comparatively high.

Said different sections of the movement path can be defined very differently and do not necessarily have to cover the entire movement path in this respect. In general, there can also be regions of the movement path that are not considered for the improvement of the movement sequence, i.e. in which no disturbances detected with respect to frequencies are determined or in which the speeds associated with the points of the movement path are not modified. The plurality of different sections of the movement path are preferably disjoint. The sections can in this respect also be defined as waypoints with a respective associated corridor.

In accordance with an advantageous embodiment, the plurality of different sections adjoin one another without gaps and together form at least a part of the movement path, wherein they can in particular together form the entire movement path. In this regard, the movement path can be divided into the plurality of different sections. The number and/or the length of the sections is in this respect preferably settable, wherein not all the sections have to have the same length. Due to sections of different lengths, the method can be adapted to the complexity of the respective movement path.

In accordance with a further advantageous embodiment, said determination of the modified speed development comprises points of sections for which a comparatively large frequency has been determined being associated with a speed that is decreased in comparison with the speed development of the preplanned movement sequence, and/or points of sections for which a comparatively small frequency has been determined being associated with a speed that is increased in comparison with the speed development of the preplanned movement sequence. A comparatively large frequency can in particular be present when the frequency is greater than a first threshold value. A comparatively small frequency can in particular be present when the frequency is less than a second threshold value. The first threshold value and the second threshold value, if both are provided, can be identical. This is, however, not necessarily the case. Decreasing the speed in sections with frequently occurring disturbances helps to increase the safety of the robot for a human working together with the robot as well as for other objects in the environment of the robot and to simultaneously avoid excessive wear of the robot due to abrupt deviations from the movement sequence. The productivity and thus the profitability of the robot is increased by increasing the speed in sections with infrequently occurring disturbances.

In accordance with a further advantageous embodiment, said determination of the modified speed development comprises, for each of the sections, associating each point of the respective section with a modified speed that is determined based on an initial speed in dependence on the frequency determined for the respective section. This initial speed can in particular be the speed that is associated with the respective point in accordance with the speed development of the preplanned movement sequence.

However, a speed that is associated with one or more other points of the respective section in accordance with the speed development of the preplanned movement sequence can also be used as the initial speed, starting from which the modified speed for a respective point is determined. For example, for the initial speed, the speed can be used that is associated with a point that bounds the section (start point or end point of the section) or defines a center of the section (middle point of the section). The initial speed can, for example, be associated with a plurality of points in that said initial speed corresponds to the average speed of the speeds associated with these points in accordance with the speed development of the preplanned movement sequence. In this regard, for all the points of a respective section, the determination of the modified speed can be based on the same initial speed. Since the frequency of detected disturbances is furthermore the same for all the points of a respective section, provision can be made that, as a result, the same modified speed is associated with all the points of a respective section.

However, this is not necessarily the case. For example, provision can also be made that in each section, in each case only for one or more individual points of this section, the modified speed is determined directly from the initial speed and the frequency of disturbances in the respective section is determined and that the modified speed for the remaining points of the movement path is determined by interpolation. For, in this case as well, the determination of the modified speed for a respective point depends (at least indirectly as a result of the interpolation) on the frequency of disturbances that have been detected during the repeated run-through of the preplanned movement sequence in the section in which the respective point lies.

In accordance with a further advantageous embodiment, said determination of the modified speed comprises multiplying said speed on which the determination is based (i.e. the speed designated above as the initial speed) by a factor that is a monotonically decreasing function, in particular an e.g. strictly monotonically decreasing function, preferably a linear function, of the frequency determined for the respective section. The modified speed (possibly apart from a limiting and/or low-pass filtering, which will be described further below) can in particular just correspond to the result of this multiplication.

If said function has a zero, this zero is preferably at a frequency that does not occur in practice in order to avoid the factor from becoming negative. This can, for example, be achieved by using a function whose zero lies at a frequency that is greater than the number of repetitions of said run-through of the preplanned movement sequence. The dynamics of the improvement can be predefined by the course, in particular the slope, of the function. In particular for a linear function, the ordinate intercept can, for example, lie between 1 and 2, e.g. amount to 1.2, so that the speed is increased by 20% in sections in which no disturbances have been detected.

Provision can also be made that the function is constant in each case for frequencies that are less than a first limit frequency and frequencies that are greater than a second limit frequency. In the range between the first and the second limit frequency, the function can in particular be linear. For example, in the constant ranges, the function can have a value of 1.2 and 0.1 so that in sections with frequencies that are less than the first limit frequency, the speed is increased by 20%, and in sections with frequencies that are greater than the second limit frequency, the speed is reduced by 90%. In sections with frequencies disposed therebetween, the speeds change in accordance with the downward course of the function.

In accordance with a further advantageous embodiment, the modified speed is limited to values that are less than a limit speed. Such a limitation can in particular be provided by calculating an initially provisional value for the determination of the modified speed in accordance with a predetermined calculation method; said provisional value then only actually being used as the modified speed if it is not greater than the limit speed, and otherwise the limit speed being used as the modified speed instead of the provisional value. The calculation method can, for example, correspond to the described multiplication of an initial speed by a factor, the result of which is then replaced by the limit speed if it is greater than the limit speed.

The limit speed can be fixedly predefined or can also be settable. Furthermore, the limit speed can be defined as an absolute value or can be defined relative to the respective initial speed (for example, as a percentage change). It can be ensured by an absolute limit speed that the modified speed cannot increase above a certain value even in sections with few disturbances. It can be ensured by a relative limit speed that the speed does not increase too quickly. It is generally conceivable to limit the modified speed both by an absolute limit speed and by a relative limit speed, namely to the smaller value in each case.

In this respect, the limit speed does not have to be the same for all the sections. The limit speed can in particular be individually settable for the different sections. For example, a higher limit speed can be set for a section of the movement path in which the robot moves in a space that can be expected (with sufficient certainty) to always be free of obstacles than for a section in which the robot can be expected to move in the vicinity of objects.

Provision can also be made that, for each point, the limit speed corresponds to the speed associated with the respective point in accordance with the speed development of the preplanned movement sequence so that the speed associated with the respective point cannot increase, but can only decrease. Furthermore, provision can be made that for each of the sections, for each point of the respective section, the limit speed corresponds to the greatest speed of the speed development of the preplanned movement sequence within the respective section so that the speeds associated with the points of the respective section cannot increase above the maximum speed of the section and can thus at least substantially only decrease. Furthermore, provision can be made that, for each point, the limit speed corresponds to the overall greatest speed of the speed development of the preplanned movement sequence so that the modified speed for each point as a whole cannot become greater than the greatest original speed.

In accordance with a further advantageous embodiment, a low-pass filter is applied to the determined modified speeds. The low-pass filtered modified speeds are then included in the modified speed development. The low-pass filter can be fixedly predefined or settable in this respect. Due to the low-pass filtering, the fact is compensated that when determining the modified speed development, modified speeds are determined for all the points of a respective section in dependence on the same frequency determined for the respective section, but the frequencies can differ greatly for points of different sections so that jumps or kinks can occur in the development of the determined modified speeds that can have a stressing effect on the robot joints and that can have a hectic and thus unsettling effect on a human working together with the robot. The application of a low-pass filter advantageously results in the modified speed development being smoothed so that these disadvantages are avoided.

In accordance with a further advantageous embodiment, the number of repetitions of said run-through of the preplanned movement sequence is settable (during which run-through—as described—disturbances in the environment of the robot are detected before the speed development is modified for different sections of the movement path in dependence on the frequency of detected disturbances in the respective section). The number is expediently selected such that the determined frequencies of disturbances detected in the different sections of the movement path are sufficiently representative of where disturbances occur frequently or rarely along the movement path. This can in particular be the case when the ratio of the determined frequencies to one another only changes insignificantly on a further run-through of the preplanned movement sequence.

In accordance with a further advantageous embodiment, the movement sequence is iteratively improved by performing the method multiple times and, in so doing, using the improved movement sequence last provided in a respective iteration as the preplanned movement sequence in the respective next iteration. In the second iteration of the method, provision is therefore made that the robot is controlled to repeatedly run through the improved movement sequence provided as a result of the first iteration, that disturbances in the environment of the robot are detected in so doing and the speed development of the improved movement sequence is modified for different sections of the movement path in dependence on the frequency of these disturbances in order to obtain a further improved movement sequence for whose repeated run-through the robot is then again controlled in a third iteration, and so on, so that the movement sequence is improved further and further. In particular in the case of such a multiple run-through of the method, it is expedient not to set the number of repetitions of the run-through of the respective preplanned movement sequence too low so that the movement sequence does not change too often and enough time remains for a human working together with the robot to get used to the change.

BRIEF DESCRIPTION OF THE DRAWINGS

The invention will be explained in more detail in the following only by way of example with reference to the Figures.

DETAILED DESCRIPTION

Figure 1:
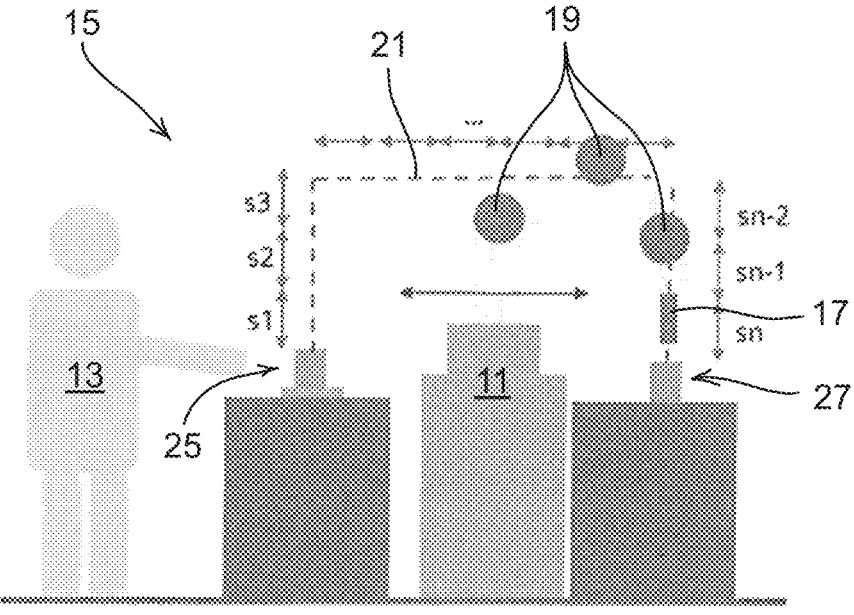
FIG. 1 shows, in a schematic representation, a robot and a human that work together as part of a human-robot collaboration.

In FIG. 1, in a greatly simplified schematic representation, a robot 11 and a human 13 are shown that work together as part of a human-robot collaboration. The human 13 is thereby at least temporarily located in an environment 15 of the robot 11 that is accessible to the robot 11 so that there is generally a risk of a collision of the robot 11 and the human 13.

The robot 11 is configured as a robot arm at whose free end a tool 17 is provided. The robot 11 has a plurality of joints 19 that can be adjusted to move the tool 17 to different positions within the environment 15. The robot 11 can in particular be controlled to run through a preplanned movement sequence that comprises a defined movement path 21 along which the robot 11 is to move in order to perform a specific task, and a defined speed development 23 (cf. FIG. 2) according to which each point of the movement path 21 is associated with a speed v at which the robot 11 is to move at the respective point.

Figure 2:
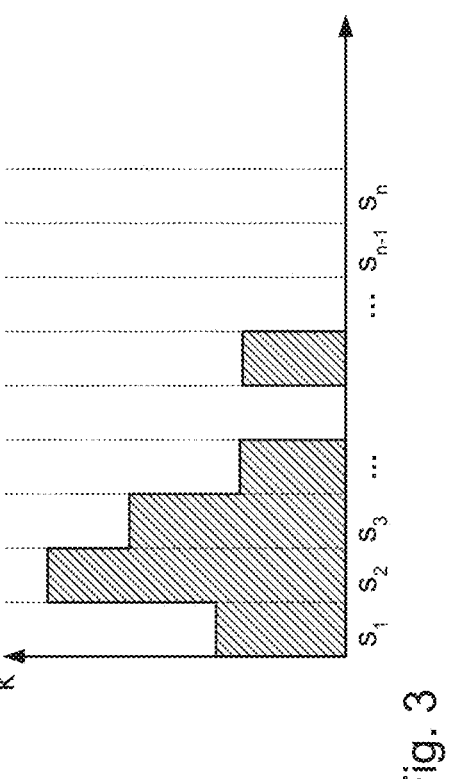
FIG. 2 shows an exemplary speed development of a preplanned movement sequence.

For example, the movement path 21 of the preplanned movement sequence can extend along the broken line shown in FIG. 1 from a first work location 25 to a second work location 27. A speed v is in this respect associated with each point of the movement path 21 in accordance with the speed development 23 that is shown in FIG. 2 as a curve of the speed v over the position along the movement path 21. The robot 11 is therefore controlled to move from the first work location 25 along the movement path 21 shown to the second work location 27 (and also back again along the same movement path 21), and indeed such that in this respect the robot 11 moves at each point of the movement path 21 at the speed v associated with the respective point in accordance with the speed development 23. This preplanned movement sequence can, for example, have been defined in advance in accordance with known methods of path planning with regard to the task to be performed as well as to the spatial conditions.

To protect the human 13 who works together with the robot 11 during operation of the robot 11, the preplanned movement sequence is not necessarily strictly followed. Instead, a sensor system (not shown) is provided by means of which the environment 15 of the robot 11 is monitored to be able to detect whether a disturbance is present, i.e. whether an object, in particular the human 13, is currently in the environment 15 or enters into the environment 15 and whether an endangerment of the respective object by the robot 11, namely in particular the risk of a collision with the robot 11, results therefrom. If this is the case, a protective measure is triggered that can consist of slowing down the movement of the robot 11 or at least temporarily suspending it completely and/or controlling the robot 11 to perform a movement deviating from the movement path 21 in order to avoid the object. Irrespective of the method according to which disturbances are detected and evaluated and the method according to which protective measures are possibly triggered in response thereto, the method in accordance with the invention aims to keep the intensity of a reaction to a detected disturbance as low as possible, but, at the same time, to impair the productivity of the robot 11 as little as possible or even to increase it.

For this purpose, provision is made in accordance with the invention that the robot 11 is controlled to repeatedly run through the preplanned movement sequence. The robot 11 is therefore initially operated in a regular manner for a certain predefined or predefinable number of run-throughs in order to perform the task to be completed in cooperation with the human 13. This makes it possible to obtain findings in an empirical manner on the extent to which an endangerment of the human 13 occurs in this respect or protective measures have to be triggered in response to such hazards. Specifically, provision is made for this purpose that the environment 15 of the robot 11 is monitored during the repeated run-through of the preplanned movement sequence and, in so doing, disturbances are detected that emanate from objects, in particular the human 13, that are located in the environment 15 or enter into the environment 15 so that an endangerment of the respective object by the robot 11 results therefrom. These findings can then be used to improve the preplanned movement sequence.

This takes place in that, for a plurality of different sections $s_1$-$s_n$ of the movement path 21, the frequency k of disturbances detected in the respective section is determined and the speeds v associated with the points of the movement path 21 are subsequently modified in dependence on these frequencies k to obtain a modified speed development 31 or 33 (cf. FIGS. 5 and 6) that can then form the improved movement path together with the unmodified movement path 21. As can be seen in FIG. 1, the movement path 21 is for this purpose completely divided into the plurality of different sections $s_1$-$s_n$ that are disjoint from one another and that each have the same length. In general, however, the different sections $s_1$-$s_n$ can also be defined differently.

Figure 3:
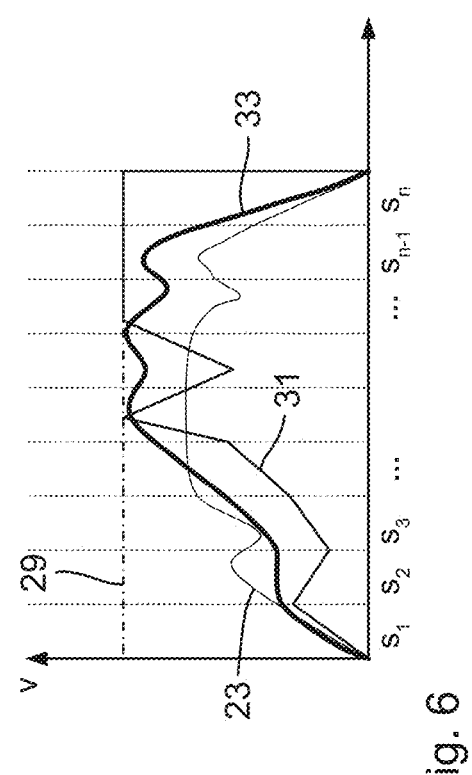
FIG. 3 shows exemplary frequencies, at which disturbances were detected in different sections of the movement path of the preplanned movement sequence on a repeated run-through of the preplanned movement sequence, as a frequency distribution over the different sections.

The frequencies k of the disturbances detected in the different sections $s_1$-$s_n$ during the repeated run-through of the preplanned movement sequence can be plotted over the different sections $s_1$-$s_n$ so that the histogram shown in FIG. 3, for example, results. The speeds v that are each associated with one of the points of the movement path 21 can be modified based on these data. In this respect, for each point, an initial speed is first determined that can be the speed v associated with the respective point in accordance with the speed development 23 or e.g. an average, initial or final speed of the section $s_1$-$s_n$ in which the respective point lies. This initial speed is then multiplied by a factor y that includes the frequency k determined for the respective section $s_1$-$s_n$.

Figure 4:
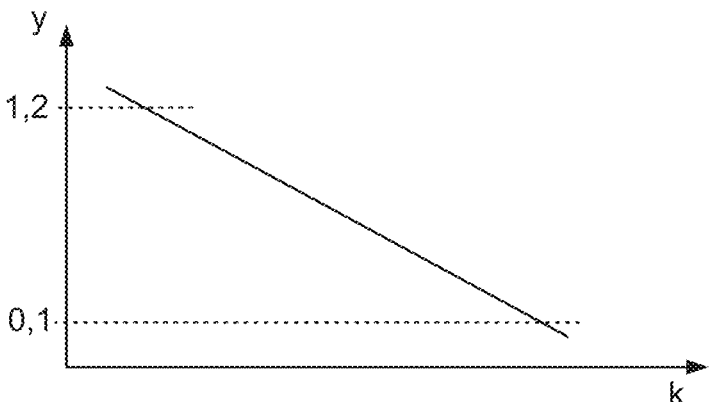
FIG. 4 shows a function that associates a frequency of detected disturbances with a factor for the calculation of a modified speed.

In the example shown, the factor y is a monotonically decreasing linear function of the frequency k that is graphically shown in FIG. 4. Since the function is decreasing, small factors y are associated with large frequencies k and large factors y are associated with small frequencies k by the function. The factor y in this respect advantageously assumes a value greater than 1, in particular in the order of magnitude of 1.2, for small frequencies k and a value between 0 and 1, in particular in the order of magnitude of 0.1, for large frequencies k. In this way, in sections $s_1$-$s_n$ for which a comparatively large frequency k of disturbances has been determined, the speed v is substantially decreased (so that it is possible to react comparatively moderately to detected disturbances there), while in sections $s_1$-$s_n$ for which a comparatively small frequency k of disturbances has been determined, the speed v is substantially increased (so that the robot 11 can move quickly and thus efficiently there due to the rarity of the disturbances).

The factors y determined using the function shown in FIG. 4 can then be sectionally applied to the speeds v of the speed development 23. In general, for each point of the movement path 21, the speed v associated with it could be multiplied by the respective factor y to obtain a modified speed v for the respective point. For simplification, this can, however, also only take place for individual or a few support points of a respective one of the sections $s_1$-$s_n$. For the remaining points, the modified speeds v can then be determined by interpolation between the support points.

In sections $s_1$-$s_n$ in which no disturbances were detected at all so that the frequency k is zero, the application of the factor y can lead to very large modified speeds v. Therefore, it can be expedient to limit the modified speeds v to values that are less than a limit speed 29 that is indicated as a chain-dotted horizontal line in FIGS. 2, 5, and 6. The limit speed 29 can, for example, be a maximum permitted speed for the robot 11. If the calculation of the modified speed v for a respective point results in a value that is greater than the limit speed 29, the limit speed 29 is used as the modified speed v instead of this value.

Figure 5:
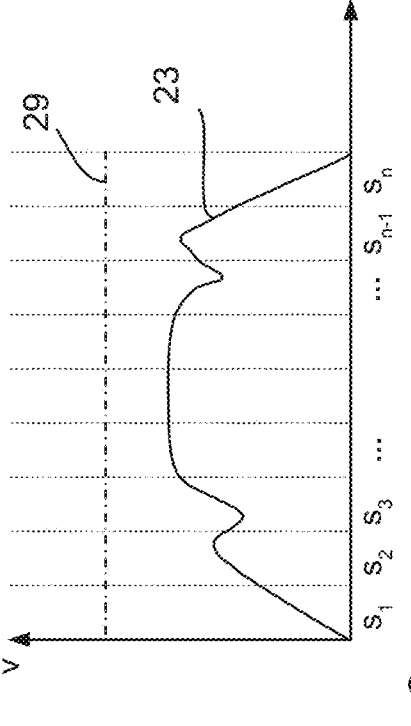
FIG. 5 shows a preliminary modified speed development that is obtained by applying the factor determined using the function shown in FIG. 4 in dependence on the frequencies shown in FIG. 3 to the speed development shown in FIG. 2.

An exemplary and (in the example shown) preliminary modified speed profile 31, according to which each point of the movement path 21 is associated with a modified speed v determined in this way, is shown in FIG. 5 in superposition with the original speed development 23 of the preplanned movement sequence. As can be seen, due to the mentioned limitation, the preliminary modified speed profile 31 does not have speeds v that are greater than the limit speed 29.

Since the different sections $s_1$-$s_n$ are considered completely independently of one another for the determination of the modified speeds v, sudden sharp changes in the speed v occur in the resulting preliminary modified speed profile 31, which changes can be recognized as kinks in the preliminary modified speed profile 31 and can have a stressing effect on the robot joints 19. Furthermore, the movements of the robot 11 can thereby be perceived as hectic by the human 13 and can thus have a psychologically stressful effect.

Figure 6:
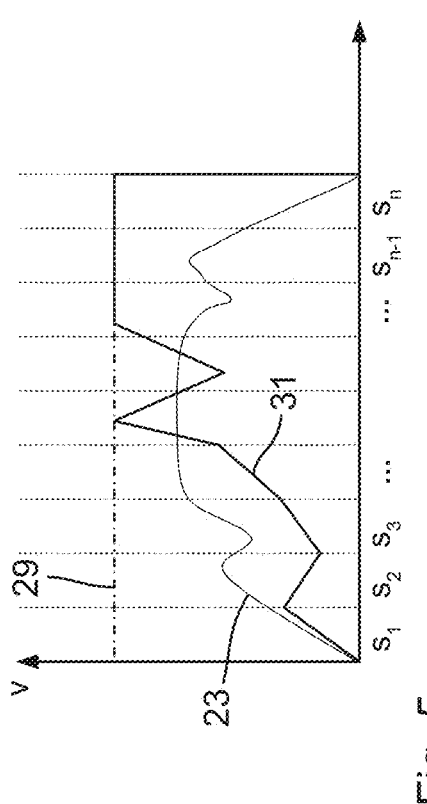
FIG. 6 shows a modified speed development that results by smoothing the preliminary modified speed development shown in FIG. 5 by means of a low-pass filter.

To avoid this, a low-pass filter is applied to the preliminary modified speed profile 31. In this way, the modified speed development 33 results that is shown in FIG. 6 in superposition with the speed development 23 and with the preliminary modified speed development 31, that is smoothed in comparison with the preliminary modified speed development 31 as a result of the low-pass filtering, and that therefore no longer has any kinks. Finally, this modified speed development 33, together with the (unmodified) movement path 21, can form the improved movement path that is then used for the further control of the robot 11. As a result, the robot 11 then moves faster in sections $s_1$-$s_n$ with few disturbances compared to the preplanned movement sequence and slower in sections $s_1$-$s_n$ with many disturbances compared to the preplanned movement sequence so that the productivity of the robot 11 increases and the safety of the human 13 is simultaneously ensured without the robot 11 being subject to high wear. The fact that the movement path 21 remains unchanged in this respect also contributes to the user-friendliness and the acceptance of the cooperation with the robot 11. The manner in which the movement sequence is improved, in particular the manner in which the modified speed development 33 is determined, is in this respect comparatively simple and thus not very computationally intensive so that the improvement does not place high demands on the processing power, let alone requires separate hardware.

The method described can be performed iteratively, wherein the improved movement sequence obtained as a result of one iteration of the method is used as the preplanned movement sequence in the next iteration. In this way, the movement sequence can be improved further and further—or at least until further iterations no longer lead to a significant improvement.

REFERENCE NUMERALS

11 robot
13 object/human
15 environment
17 tool
19 joint
21 movement path
23 speed development
25 first work location
27 second work location
29 limit speed
31 preliminary modified speed development
33 modified speed development

The invention claimed is:

1. A method of improving a preplanned movement sequence for the control of a robot operated as part of a human-robot collaboration, wherein the preplanned movement sequence comprises a defined movement path along which the robot is to move in order to perform a specific task, and a defined speed development according to which each point of the movement path is associated with a speed at which the robot is to move at the respective point, the method further comprising:

controlling the robot to repeatedly run through the preplanned movement sequence;

during the repeated run-through of the preplanned movement sequence, monitoring an environment of the robot and, in so doing, detecting disturbances that emanate from objects that are located in the environment or that enter into the environment so that an endangerment of the respective object by the robot results therefrom, on the repeated run-through of the preplanned movement sequence, for a plurality of different sections of the movement path, determining a frequency of disturbances detected in the respective section, this frequency being a frequency of how often a disturbance has been detected during the repeated run-through of the preplanned movement sequence while the robot was located at a point of the movement path that lies in the respective section;

after the repeated run-through of the preplanned movement sequence, determining a modified speed development by modifying, for the different sections, the speeds associated with the points of the respective section in dependence on the frequency determined for the respective section; and providing for the further control of the robot an improved movement sequence that comprises the modified speed development.

2. The method in accordance with claim 1, wherein the improved movement sequence comprises the same movement path as the preplanned movement sequence.

3. The method in accordance with claim 1,
wherein the plurality of different sections adjoin one another without gaps and together form at least a part of the movement path, and wherein the number and/or the length of the sections is/are settable.

4. The method in accordance with claim 1, wherein the determination of the modified speed development comprises associating points of sections for which a comparatively large frequency has been determined with a speed that is decreased in comparison with the speed development of the preplanned movement sequence, and/or associating points of sections for which a comparatively small frequency has been determined with a speed that is increased in comparison with the speed development of the preplanned movement sequence.

5. The method in accordance with claim 1, wherein the determination of the modified speed development comprises, for each of the sections, associating each point of the respective section with a modified speed that is determined based on the speed that is associated with the respective point or with one or more other points of the respective section in accordance with the speed development of the preplanned movement sequence, in dependence on the frequency determined for the respective section.

6. The method in accordance with claim 5, wherein the determination of the modified speed comprises multiplying said speed on which the determination is based by a factor that is a monotonically decreasing function of the frequency determined for the respective section.

7. The method in accordance with claim 6, wherein the monotonically decreasing function is a linear function.

8. The method in accordance with claim 5, wherein the modified speed is limited to values that are less than a limit speed.

9. The method in accordance with claim 8, wherein the limit speed is individually settable for the different sections.

10. The method in accordance with claim 8, wherein, for each point, the limit speed corresponds to the speed associated with the respective point in accordance with the speed development of the preplanned movement sequence.

11. The method in accordance with claim 8, wherein, for each of the sections, for each point of the respective section, the limit speed corresponds to the greatest speed of the speed development of the preplanned movement sequence within the respective section.

12. The method in accordance with claim 8, wherein, for each point, the limit speed corresponds to the overall greatest speed of the speed development of the preplanned movement sequence.

13. The method in accordance with claim 5, wherein a low-pass filter is applied to the determined modified speeds.

14. The method in accordance with claim 1, wherein the number of repetitions of said run-through of the preplanned movement sequence is settable.

15. The method in accordance with claim 1, wherein the movement sequence is iteratively improved by performing the method multiple times and, in so doing, using the improved movement sequence provided in a respective iteration as the preplanned movement sequence in the respective next iteration.

16. The method in accordance with claim 1, wherein said modifying, for the different sections, the speeds associated with the points of the respective section comprises multiplying an initial speed of the respective section with a factor that is a function of the frequency determined for the respective section, wherein the factor has a value between 1 and 2 if the frequency is zero, and is otherwise less than this value.

17. The method in accordance with claim 16, wherein said modifying, for the different sections, the speeds associated with the points of the respective section further comprises setting the modified speed to a limit speed if the result of said multiplying is greater than the limit speed.

18. A method of improving a preplanned movement sequence for the control of a robot operated as part of a human-robot collaboration, wherein the preplanned movement sequence comprises a defined movement path along which the robot is to move in order to perform a specific task, and a defined speed development according to which each point of the movement path is associated with a speed at which the robot is to move at the respective point, the method further comprising:

controlling the robot to repeatedly run through the preplanned movement sequence;

during the repeated run-through of the preplanned movement sequence, monitoring an environment of the robot and, in so doing, detecting disturbances that emanate from objects that are located in the environment or that enter into the environment so that an endangerment of the respective object by the robot results therefrom, on the repeated run-through of the preplanned movement sequence, for a plurality of different sections of the movement path, determining a frequency of disturbances detected in the respective section;

after the repeated run-through of the preplanned movement sequence, determining a modified speed development by modifying, for the different sections, the speeds associated with the points of the respective section in dependence on the frequency determined for the respective section; and providing for the further control of the robot an improved movement sequence that comprises the modified speed development;

wherein said modifying, for the different sections, the speeds associated with the points of the respective section comprises multiplying an initial speed of the respective section with a factor that is a function of the frequency determined for the respective section, wherein the factor has a value between 1 and 2 if the frequency is zero, and is otherwise less than this value.

19. The method in accordance with claim 18, wherein said modifying, for the different sections, the speeds associated with the points of the respective section further comprises setting the modified speed to a limit speed if the result of said multiplying is greater than the limit speed.

\* \* \* \* \*